Jan. 18, 1955  C. M. CHAMBERS ET AL  2,699,570
MACHINE FOR REMOVING THE CASING FROM SAUSAGES
Filed July 22, 1952  4 Sheets-Sheet 1

INVENTORS
Charles M. Chambers
and Robert L. Meeks
BY
Dodge and Sons
ATTORNEYS

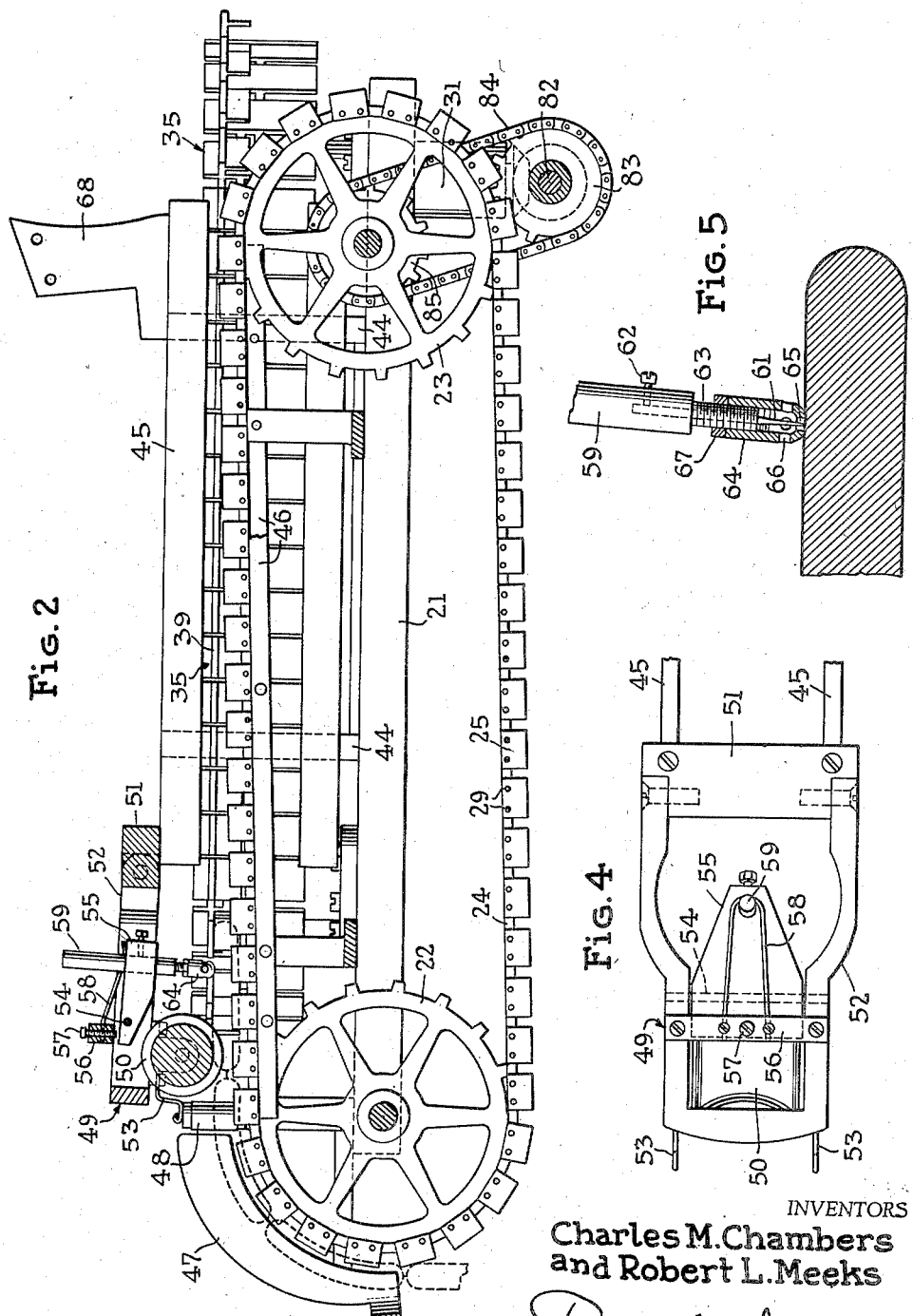

Jan. 18, 1955
C. M. CHAMBERS ET AL
2,699,570
MACHINE FOR REMOVING THE CASING FROM SAUSAGES
Filed July 22, 1952
4 Sheets-Sheet 3
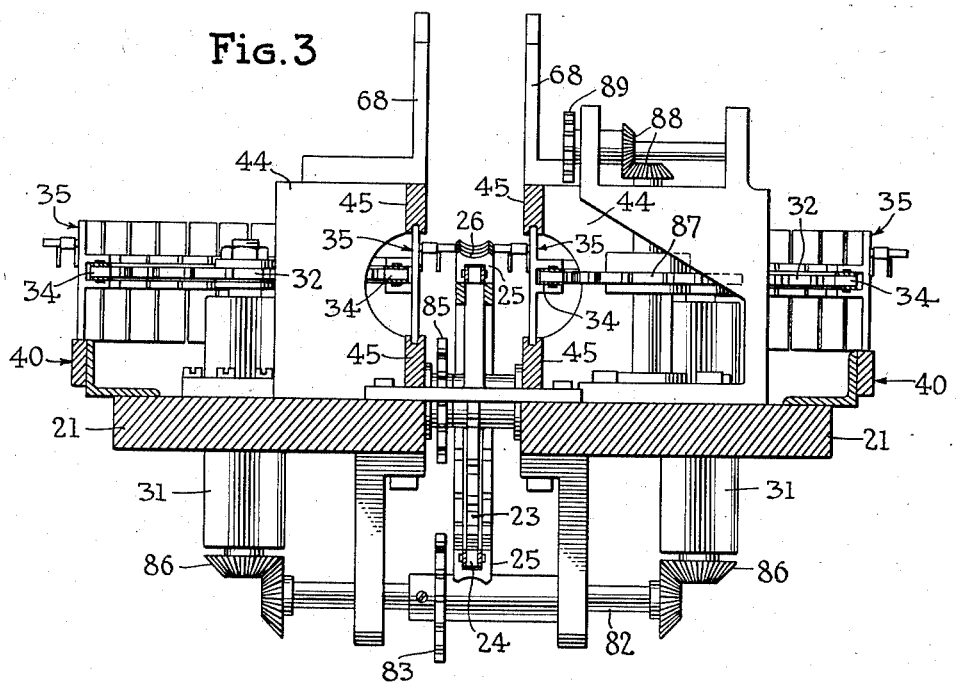
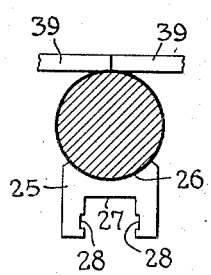
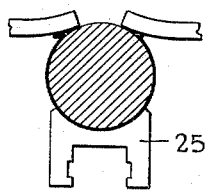
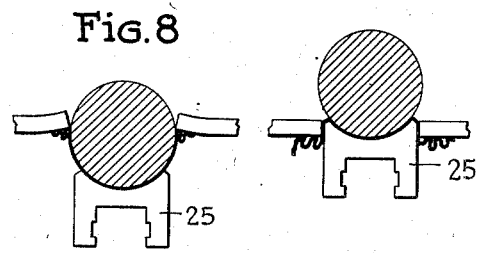
INVENTORS
Charles M. Chambers
and Robert L. Meeks
BY Dodge and Sons
ATTORNEYS

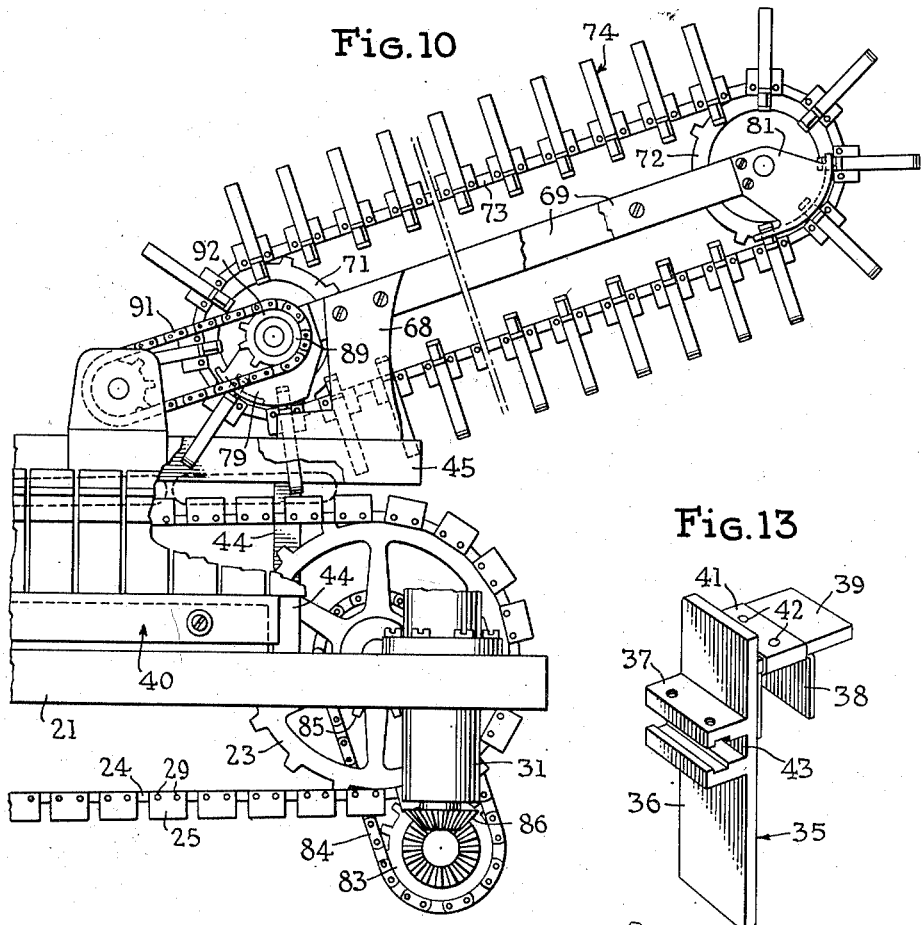

United States Patent Office 2,699,570
Patented Jan. 18, 1955

2,699,570

MACHINE FOR REMOVING THE CASING FROM SAUSAGES

Charles M. Chambers and Robert L. Meeks, Phoebus, Va.

Application July 22, 1952, Serial No. 300,168

12 Claims. (Cl. 17—1)

This invention relates to a machine for stripping the casings from link sausages. The word "sausage" is used in its broad generic sense to denote frankfurters, wieners and the like.

In recent years thin plastic tubing has come into extensive use as a sausage casing. This casing is not edible and meat packers have found it desirable to strip these casings from the sausages prior to marketing. It is desirable that these casings be stripped in such a way that the skinless sausage which is produced, shows no traces of the skin ever having been removed, because such traces would detract from the appeal of the product to the purchaser.

In the past this operation was usually carried out by hand and was therefore time consuming and expensive. A machine built according to the present invention carries out this stripping operation automatically and at a greatly increased speed. Furthermore the machine is capable of carrying out the stripping operation without leaving any traces of the removal operation. As a matter of fact the only visible traces of the skin which appear on a sausage which has been skinned in this machine are the wrinkles in the surface of the sausage which result from irregularities and folds in the casing.

Basically the machine comprises a main conveyor on which the sausage links are carried beneath a cutter which slits the casings longitudinally. This cutter is preferably of the form described and claimed in the co-pending divisional application of Meeks, one of the co-inventors of this machine which was filed on August 18, 1953, and assigned Serial No. 305,013. After the casing is slit and while the sausage is still supported by the conveyor it comes in contact with two traversing wiping means which are arranged above the conveyor so that they engage the casing on opposite sides of the slit. The traversing wiping means are each guided along a definite path a major directional component of which is parallel with the direction of travel of the main conveyor and the chain of link sausages supported thereby. The paths of the wiping means, however, each has two minor directional components which are at right angles to each other. One of these directional components causes the wipers to recede from one another and thereby affords an interval between them which increases in the direction of travel of the wiping means. The second component causes the wiping means to move downwardly relatively to the path of the main conveyor. This relationship between the direction of motion of the wiping means and the main conveyor causes the wiping means to draw the casing away from the slit therein and downwardly around the link to expose the sausage. When this wiping action is completed and the sausage is exposed, it is desirable that it be picked up by a take-off mechanism and conveyed to a place of storage or packing as may be desired. It will be understood, of course, that the take-off mechanism is not essential to the operation of the machine and it may under certain circumstances be omitted.

Ordinarily the sausages are delivered to the machine without any pretreatment. Experience with the machine during its development indicates that if the sausage has a high flour or starch content it may be desirable to preheat or steam the sausages slightly which causes the casings to be loosened from the filler.

This pretreatment when necessary may be carried out in various ways, and the particular mode of pretreatment is not a part of the present invention.

The invention will be described in detail having reference to the accompanying drawings in which:

Figure 2 is a sectional view looking at the lefthand side of the machine as shown in Figure 1 along a longitudinal plane just to the right of the centerline of the machine. The parts of the stripper mechanism on the right hand side of the machine which would appear in this view have been omitted to enable a clear showing to be made.

Figure 3 is a tranverse section taken on line 3—3 of Figure 1. Certain parts are omitted in the interest of clarity.

Figure 4 is a detail top plan view of the slitter mounting.

Figure 5 is a detail side elevation, partly in section, showing the slitting operation.

Figure 1:
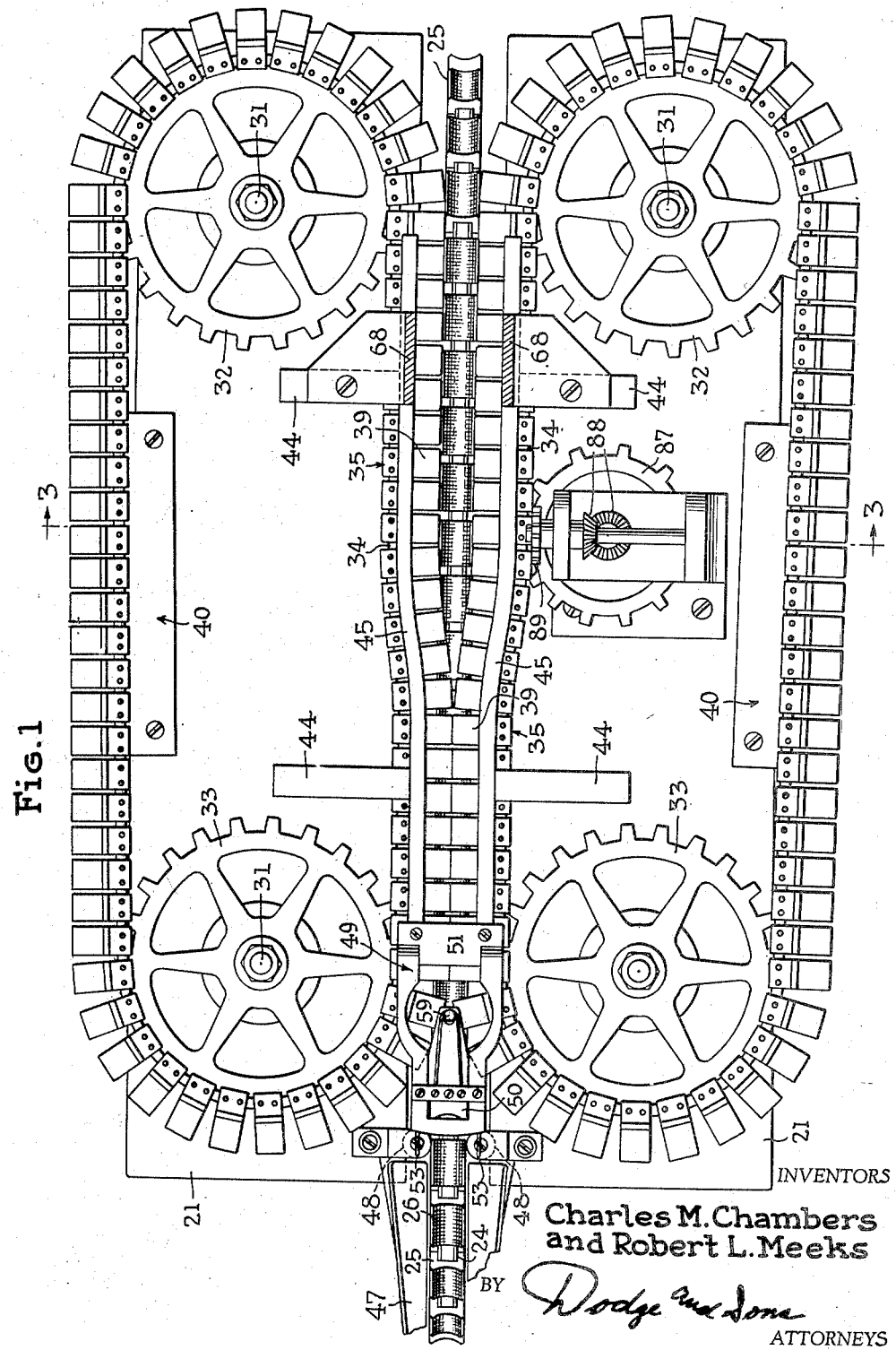
Figure 1 is a top plan view of the machine.

Figures 6, 7, 8, and 9 are detailed views showing the progressive stripping of the casing.

Figure 10 is a fragmentary side elevation, certain parts being broken away, showing the take-off mechanism by which the stripped sausages are carried from the machine.

Figures 11 and 12 are detail views of the clamping fingers of the take-off mechanism and showing their actuation.

Figure 13 is a perspective view of a preferred form of stripper finger.

Figure 14 is a perspective view of an alternative form of stripper finger.

Referring first to Figures 1 and 2, it will be seen that the machine comprises two spaced base plates 21 which are adapted to be fixedly secured to any suitable bed (not shown). Mounted on longitudinally spaced horizontal axles which extend between the base plates 21 are an idler sprocket 22 and a driven sprocket 23. A conventional chain belt 24 extends between and around the sprockets 22 and 23.

Mounted on the links of the chain belt 24 are individual conveyor blocks 25. The form of these conveyor blocks is best shown in Figures 6 through 9. The upper surface of the block as seen in Figure 6 is provided with a recess 26. A longitudinal channel 27 is formed in the lower face of the block 25 and is provided on each side with undercut grooves 28. These blocks 25 may be slid into place on the individual links of the chain belt 24, the grooves 28 being adapted to receive the heads of the pins which connect the links of the chain belt 24. The blocks are secured in place by spaced set screws 29. As is shown in Figure 1, the surface of the cylindrical recess 26 is serrated.

The chain belt 24, together with the attached conveyor blocks 25 and sprockets 22 and 23 comprise a main conveyor upon which the sausages to be skinned are carried. Two vertical spindles 31 extend upward through each of the base plates 21. A driven sprocket 32 is mounted on each of the vertical spindles 31 at one end of the machine and corresponding idler sprockets 33 are mounted upon the spindles at the other end of the machine. A chain belt 34 extends between and around each pair of sprockets 32 and 33. Mounted upon the individual links of the chain belt 34 are separate stripper or wiping members 35.

The construction of these stripper or wiping members is best shown in Fig. 13. Each of the members 35 comprises a backing plate 36 from one face of which extends a mounting boss 37 and from the other face of which extends a generally U-shaped bracket 38. One leg of the bracket 38 is fastened to the face of the plate 36. A finger 39 of flexible plastic material, e. g. synthetic rubber, is fastened to the base of the U-shaped bracket 38 by an encircling collar 41 and rivets 42 passing therethrough.

The mounting boss 37 is provided with a channel 43 similar to the channel 37 in order that the member 35 may be mounted on the chain belt 34. The flights of members 35 adjacent to the main conveyor follow paths which diverge and descend relatively to the path of the main conveyor.

Mounted on each of the base plates 21 are two spaced supporting blocks 44. Fastened to the upper and lower edges of each of the blocks 44 are guideways 45 which extend horizontally between the blocks 44. These guideways 45 are so formed that the stripper or wiping fingers 39 in the region of the idler pulleys 33 are in end to end relationship and overlie the main conveyor. As the members 35 progress toward the driven sprocket 32 they are caused to diverge from one another, as best shown in Fig. 1.

As seen in Fig. 2, the main conveyor is so mounted relatively to the base plates 21 that the blocks 25 move along an ascending path as they progress from the idler sprocket 22 to the driven sprocket 23. Mounted beneath the upper flight of the main conveyor is a guide 46 which reacts against the conveyor blocks 25 and the chain belt 24 so as to maintain these parts in a straight line. A similar guide 40 supports the outboard flights of stripper mechanisms 35.

It will be seen that the paths of the two wiping or stripping means are substantially parallel with the path of the main conveyor. Each path is modified by two minor transverse motion components. One of these components causes the fingers to recede from one another to afford an increasing interval between them. The other causes the sausages to move gradually through this increasing interval.

Mounted on the receiving end of the machine, i. e. the lefthand end, as seen in Fig. 2, is an arcuate guideway 47. Adjacent the upper ends of the guideway 47 are spaced vertical guide rollers 48. Mounted above the vertical centerline of the main conveyor is a slitter assembly 49. The construction of this assembly is best shown in Fig. 4.

A hinge plate 51 extends transversely of the machine between the ends of the upper guideways 45. Pivoted to the hinge plate 51 is a generally U-shaped body member 52. Fastened to the base of the U-shaped member 52 are motion limiting fingers 53 which engage the upper ends of the journals upon which the guide rollers 48 are mounted to limit downward movement of the assembly 49. A grooved roller 50 depends from the hinge plate 51 and engages the sausages as shown in dotted lines in Fig. 2. A hinge pin 54 extends between the legs of the U-shaped body member 52. A cutter supporting block 55 is pivoted on the pin 54. A stop supporting member 56 also extends transversely between the legs of the body member 52 and is provided at its center with a screw 57 which affords an adjustable stop for the cutter supporting block 55. A spring 58 reacts between the member 56 and the cutter supporting block 55.

The cutter, as shown in Figure 5, comprises a cylindrical body portion 59 which is vertically adjustable in the cutter supporting block 55. The lower end of the cylindrical body 59 is counterbored to receive a tapered needle 61. A set screw 62 maintains the assembled relation of the needle 61 and the body 59. The lower end of the body 59 is of a reduced diameter and screw threaded as shown at 63. A generally cylindrical shroud 64 is threaded on to the lower end of the body 59. The lower end of the shroud 64 is hemispherical and is provided with an axial opening 65 for the needle 61 and with a series of spaced radial ports 66. The cylindrical shroud 64 is adjustable so as to control the distance that the pin 61 projects beyond the shroud 64. The lock nut 67 is provided so that the shroud 64 may be secured in its adjusted position.

Mounted at the delivery end of the machine is a take-off mechanism which is illustrated in Fig. 10. The take-off mechanism is supported by a pair of spaced upward extending arms 68. Attached to each of the arms 68 are the upward directed side bars 69. A driven sprocket 71 is journaled on a horizontal axis extending between the lower ends of the guide bars 69 and an idle sprocket 62 is journaled on a horizontal shaft extending between the upper ends of the side bars 69. A chain belt 73 extends between and around the sprockets 71 and 72 and its individual links carry the pick up mechanisms 74. These pick up mechanisms 74 are shown in detail in Figs. 11 and 12. They each comprise a main supporting block 75 which is adapted to be mounted on the chain belt 73, in the same manner as the conveyor blocks 25 are mounted on the chain 24. Opposed arms 76 are hinged to opposite faces of the block 75. A spring 77 biases the arms 76 toward each other. The arms 76 carry at their upper end rollers 78 which are mounted on vertical axes. On opposite faces of the driven sprocket 71 are segmental cam members 79. These segmental cam members 79 are arranged so as to react against the rollers 78 in order to spread the arms 76. Similar cams 81 are provided at the upper end of the side bar 69 so as to spread the arms when they reach the sprocket 72. At their lowermost point of travel the lower ends of the arms 76 will be slightly above the upper surface of the conveyor blocks 25.

The driven sprockets 23, 32, and 71 are so interconnected that the lineal speeds of the main conveyor, the stripper flights and the pick up mechanisms 74 are equal. This drive may take a variety of forms. In the illustrated embodiment, the drive as best shown in Fig. 3 comprises a main shaft 82 which is disposed beneath the base plates 21. This shaft 82 is adapted to be driven by any suitable means. It carries near its center a sprocket 83. A chain belt 84, see Figure 2, extends from the sprocket 83 to the driven sprocket 85 which is mounted on the horizontal shaft which carries the sprocket 23. The spindles 31 are driven from the shaft 82 through the bevel gears 86. The pick up mechanism is driven through a train which comprises sprocket 87 which is driven from the chain belt 34, bevel gears 88, sprocket 89, chain belt 91 and driven sprocket 92 which in turn drives the sprocket 71 of the pick up mechanism.

An alternate form of stripper mechanism 35' is illustrated in Fig. 14. This stripper mechanism 35' comprises a backing plate 36' and a mounting boss 37' which are identical in form with the corresponding parts illustrated in Fig. 13. To the outer face of the backing plate 35' is secured a box like projection 38', at least the upper face of which is open. A pivot pin 93 extends between the end faces of the projection 38'. A plurality of separate stripper fingers 94 are pivoted side by side on the pin 93. These fingers 94 have a channel shaped arcuate portion which extends outward from the pin 93. At the outermost ends of the fingers 94 the channel flanges are cut away and the outermost edges of the webs are serrated as is clearly indicated at 95. These fingers 94 are made of light gauge metal and the serrated ends 95 are turned down slightly in order to provide a gripping edge to engage the sausage casings as will be more fully explained.

A spring 96 of the form shown is mounted on the pins 97 and serves to bias the stripper fingers 94 toward the position shown.

The operation of the sausage skinning machine will be best understood by referring to Figures 2, 6, 7, 8, and 9.

Referring first to Fig. 2 it will be seen that the main conveyor feeds the chain of link sausages into the skinning machine between the guideways 47 and rollers 48. The roller 50 on the cutter assembly 49 is engaged by the upper surface of the sausage and positions the cutting needle 61 in operative relation to the sausages. The downward force exerted on the needle 61 is controlled by the adjustment of the spring 58. This setting, generally speaking, is not changed for successive batches of sausages because roller 50 eliminates any variation in the needle's position which results from the variation in the diameter of the sausages.

The cutter supporting block 55 swings about the pivot 54 so that the needle 61 may enter between the links to slit the casing throughout substantially the entire length of the sausages. After the casings are slit by the cutter they are raised by the main conveyor into contact with the lower surface of the stripping fingers 39, as shown in Fig. 6. The stripper fingers 39 on each of the chain belts 34 are at the entrance end of the machine, in abutting relation. As seen in Fig. 6, fingers 39 engage the casing of the sausage at points which are adjacent to and on opposite sides of the slit formed in the casing. As the links are moved through the machine they are carried upward relatively to the stripper fingers by the main conveyor. Concurrently the stripper fingers are caused to recede from one another by the guides 45. Thus the casing is wiped away from the slit and downwardly around the sausage.

This stripping or wiping action is clearly shown in Figures 6, 7, 8, and 9 which respectively show the action of the stripper fingers 39 at successively advanced stages of motion of the chain of sausages through the machine. As clearly shown in Figure 1, the guideways 45 are curved. This configuration of the guideways causes a stripping action which occurs in stages. Initially the resilient fingers 39 exert a downward bias whereby the required frictional forces between the fingers and the casing are produced. This causes the fingers 39 to flex upward and their abutting ends to be separated slightly. During motion along the curved portions of the guideways 45 the fingers recede laterally from each other while maintaining the upward flexure which was produced in the initial stage. This is shown in Figure 7. As the fingers 39 approach their maximum lateral separation the fingers 39 tend to move back toward their initial horizontal position, as shown in Figure 8. This results in the casing being stripped downwardly more rapidly than was characteristic of the previous stage of the stripping action. Finally the fingers are moved along parallel portions of the guideways 45 in which the continued ascending movement of the main conveyor causes the downward stripping of the casing to the position shown in Figure 9.

After the casing has been wiped from around the sausages, shown in Fig. 9, the sausages are delivered to the take-off mechanism illustrated in Fig. 10. This take-off mechanism which moves in a counter-clockwise direction, as shown in this figure, is driven at approximately the same lineal speed as are the stripper fingers and the main conveyor. As the rollers 78 on the pick up mechanism pass between the segmental cams 79 their lower ends are spread, as shown in Fig. 12. This spreading of the fingers 76 permits the reception of the stripped sausages between them.

As the rollers 78 leave the cam 79 they are biased by the spring 77 to the closed position shown in Fig. 11 and grasp the sausage. This sausage is then conveyed upward until the rollers 78 reach the second segmental cams 81 where the fingers 76 are against separated and the sausage is released.

The length of the take-off mechanism shown in Fig. 10 can be varied to suit the particular installation.

The casing stripped from the sausages is carried along the main conveyor over the sprocket 23 and falls downward to a point of disposal.

It will be apparent to anyone skilled in the art that this machine could take various forms without departing from the broad inventive concept. For example in the preferred embodiment the main conveyor is disposed in a vertical plane whereas the series of stripper mechanisms are arranged in a horizontal plane. This arrangement is not essential. Various arrangements whereby the desired relative motion of the sausages and the stripper means is assured can be used. Such variations can be made without any change in the basic concept and are within the scope of the present invention.

It is also not necessary that the conveyor blocks 25 and the stripper mechanisms 35 and 35′ be carried by chain belts. Various types of endless belts may be employed.

What is claimed is:

1. Means for stripping the casings from a chain of link sausages comprising in combination a support, a conveyor mounted thereon and arranged to support said chain of sausages and move it longitudinally along a definite path; cutting means carried by said support and positioned to slit the casings of successive links as they move along an initial portion of said path; two traversing wiping means initially engaging the casing adjacent to and on opposite sides of the slit formed therein and in a region close to said cutting means; guiding means carried by said support and co-acting with said traversing wiping means to guide the latter in coordinate paths adjacent the path of said chain of links, the motion of each wiping means having a main directional component parallel with the path of the chain of links but modified by two transverse motion components at right angles to one another; one of said transverse components serving to cause the wipers to recede from one another and afford an interval which increases in the direction of travel of said wiping means, the other of which causes the links to move gradually through said increasing interval, the relative motions of said wiping means and the chain of sausages being so related that the casing is drawn away from the slit and around the link to expose the sausage, and means operatively associated with said conveyor and with said wipers to drive the same at related and approximately equal lineal speeds.

2. The combination defined in claim 1 in which said traversing wiping means each comprises spaced sprockets carried by said support; a chain belt carried by said sprockets; and casing engaging means carried by said belt, said casing engaging means comprising means affording a pivot; a plurality of fingers independently swingable about said pivot as an axis; and means biasing said fingers into engagement with said casing.

3. The combination defined in claim 1 and a take-off mechanism comprising two sprockets carried by said support and an endless belt carried by the sprockets; a series of pairs of opposed fingers pivotally carried by said belt, the fingers of each pair being movable toward and away from one another; cam means whereby said fingers are moved; means biasing each of said pairs of fingers against the surfaces of said cam means, said mechanism being positioned relatively to the conveyor so that when said fingers move toward one another they embrace between them one of said exposed sausages and carry it away from the path along which the sausages are moved by said conveyor, said fingers, when moved apart, releasing the sausage embraced thereby at a point remote from said conveyor; and means operatively associated with said mechanism to drive the same at a speed such that the series of fingers carried thereby are moved at a lineal speed related and approximately equal to the lineal speed of said conveyor.

4. Means for stripping longitudinally slit casings from cased link sausages comprising in combination a support; conveyor means carried by said support and arranged to support said slit cased sausages in end to end relation and with the slits aligned and to move said sausages along a definite path; two traversing wiping means for engaging said casing adjacent to and on opposite sides of said slit; guiding means carried by said support and co-acting with said wiping means to guide the latter along coordinate paths adjacent the path of said sausages, the motion of each wiping means having a main directional component parallel with the path of said sausages but modified by two transverse motion components at right angles to each other; one of said transverse components serving to cause said wiping means to recede from one another and afford an interval which increases in the direction of travel of said sausages, the other transverse component causing said sausages to move gradually through said increasing interval, the motions of said sausages and said wiping means being so related that the casing is drawn away from said slit and around the link to expose the sausage; and means operatively associated with said conveyor means and with the wiping means to drive the same at related and approximately equal lineal speeds.

5. Means for stripping the casing from a chain of link sausages comprising in combination a support; two endless series of moving fingers carried thereby, said series being coplanar and side by side, a portion of the fingers of one series abutting against corresponding fingers of the other series through an initial portion of their travel; guiding means carried by said support and guiding said series of fingers during a portion of their travel along coordinate paths, said paths having major directional components which are parallel but each modified by a minor transverse motion component which causes the fingers of said series to recede from one another and afford an interval therebetween which increases in the direction of motion of said fingers through said portion of travel; conveyor means carried by said support and arranged to support a chain of link sausages and guide it along a straight line path adjacent said series and having a major directional component parallel with the major directional components of said moving series but modified by a minor transverse component which causes said sausages to move progressively through the increasing interval between said fingers; a cutter carried by said support and arranged to cut the casings of successive links as they move along an initial portion of said straight line path and immediately before the casings are engaged by said fingers, the defined minor directional components of said paths causing relative motion between said sausages and fingers such that the casing is initially engaged by said abutting fingers adjacent to and on opposite sides of the cut therein and is progressively drawn away from said cut and around the sausage as it is moved along said straight line path thereby exposing said sausage; and means operatively associated with said series of fingers and with said conveyor to drive the same at related and approximately equal speeds.

6. The combination defined in claim 5 in which said conveyor comprises an endless chain belt; and a plurality of supporting members carried by the separate links thereof, each of said members have a cylindrical recess in its exposed face, the surface of said recess being serrated.

7. A device for removing the casing from a chain of link sausages comprising in combination a support; a conveyor mounted thereon and arranged to support the chain of sausages and move it longitudinally along a definite path; a cutter mounted on said support effective to slit longitudinally the casing of the successive links during travel along an initial portion of said path; two opposed series of yielding wiping fingers carried by said support for engaging said casing adjacent to and on opposite sides of the slit therein; guideways carried by said support and co-acting with said series of fingers, said guideways having oppositely directed reverse curves, said fingers being guided by said guideways along paths having a major directional component parallel with the major directional component of the path along which said sausages are moved and minor transverse components of motion introduced by said reverse curves whereby the fingers of said series are caused to recede from each other and afford an interval therebetween which increases in the direction of motion of said fingers, said conveyor having a minor transverse component of motion whereby said sausages are moved through said increasing interval and means operatively associated with the opposed series and with the conveyor to drive them at related and approximately equal lineal speeds.

8. The combination defined in claim 7 in which said series of opposed wiping fingers each comprises a series of articulated plates; at least one yielding finger carried by each of said plates, and said guideways each comprising a pair of spaced grooved bars, the bars receiving opposite ends of said plates.

9. The combination defined in claim 7 in which said series of opposed wiping fingers each comprises a series of articulated plates; a resilient finger fastened to and projecting outward from the individual plates, and said guideways each comprising a pair of spaced grooved bars, the bars receiving opposite ends of said plates.

10. The combination defined in claim 7 in which said series of opposed wiping fingers each comprises a series of articulated plates; a hinge pin carried by the individual plates and disposed in substantial parallelism with the direction of motion of said plate; at least one rigid finger swingably mounted on said pin and a spring biasing said finger away from said plate, and said guideways each comprising a pair of spaced grooved bars, the bars receiving opposite ends of said plates.

11. The combination defined in claim 7 and a take-off mechanism carried by said support and arranged to engage said sausages after they have been exposed by movement through said interval; said mechanism comprising an endless belt; a plurality of pairs of transversely movable opposed fingers mounted thereon; cam means arranged to separate said pairs of fingers prior to engagement with said sausages; biasing means urging the fingers of each pair toward one another and effective after said pairs of fingers move past the cam means to close the pairs of fingers and thus engage between them an exposed sausage; a second cam means remote from the first whereby the pairs of fingers are again moved apart to release the sausage carried thereby; and a driving connection between said belt and the means to drive the conveyor and effective to drive said belt at a lineal speed approximately equal to the lineal speed of said conveyor.

12. In a device for removing casings from cased link sausages, the combination of a support; a conveyor guided on said support and arranged to carry sausage links endwise and approximately end to end through a definite path; cutting means mounted on said support in position to engage and cut the casings of successive sausages as the latter move through an initial portion of said path; a series of opposed yielding fingers engaging the casing at opposite sides of the cut; guiding means carried by said support and co-acting with said fingers along a path having a major directional component such that the fingers may approximate the longitudinal motion of sausages whose casings are engaged thereby, said major component being modified by two transverse components at right angles to each other, namely one which guides the fingers in a separating motion which affords an increasing interval and another which causes the sausages to move through said interval; and driving means operatively associated with said conveyor and with the fingers to drive the same at related and approximately equal lineal speeds.

References Cited in the file of this patent

UNITED STATES PATENTS 2,644,979    Ball _____ July 14, 1953